US012783742B2

(12) United States Patent
Kato et al.

(10) Patent No.: US 12,783,742 B2
(45) Date of Patent: Nov. 3, 2026

(54) MOVING BODY CONTROL DEVICE, MOVING BODY CONTROL METHOD, AND STORAGE MEDIUM

(71) Applicant: HONDA MOTOR CO., LTD., Tokyo (JP)

(72) Inventors: Hisahiro Kato, Tokyo (JP); Hiroaki Hakukawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 128 days.

(21) Appl. No.: 19/013,647

(22) Filed: Jan. 8, 2025

(65) Prior Publication Data

US 2025/0307478 A1 Oct. 2, 2025

(30) Foreign Application Priority Data

Mar. 27, 2024 (JP) ................................ 2024-050799

(51) Int. Cl.
*G06F 21/55* (2013.01)
*G06F 21/86* (2013.01)

(52) U.S. Cl.
CPC .................................. *G06F 21/86* (2013.01)

(58) Field of Classification Search
CPC ...................................................... G06F 21/55
See application file for complete search history.

(56) References Cited

U.S. PATENT DOCUMENTS 11,176,229 B2 * 11/2021 Soryal .................. H04L 9/3242
11,665,001 B1 * 5/2023 Engelkemier ......... G06F 21/575
713/2
12,135,828 B2 * 11/2024 Immonen ................ G06F 21/52
2018/0074929 A1 * 3/2018 Kito .................... G06F 11/2007
2019/0191311 A1 * 6/2019 O'Brien .............. H04W 12/122
2019/0318133 A1 * 10/2019 Lulic ...................... H04L 9/0894
2019/0372944 A1 * 12/2019 Hass ................... H04L 63/0435
2019/0392149 A1 * 12/2019 Yamashita .............. G06F 21/57
2020/0213287 A1 * 7/2020 Zhang ................... H04L 63/123
2021/0344514 A1 * 11/2021 Barrett ..................... G06F 21/44
2021/0374292 A1 * 12/2021 Ramos Molinos ... G06F 21/755
2021/0406359 A1 * 12/2021 Culshaw ................ G06F 21/44
2022/0173902 A1 * 6/2022 Gao .................... H04L 65/1069
2022/0394053 A1 * 12/2022 Sorani ..................... G06F 21/57
(Continued)

FOREIGN PATENT DOCUMENTS

JP 2021-002168 A 1/2021

*Primary Examiner* — Khang Do
(74) *Attorney, Agent, or Firm* — Rankin, Hill & Clark LLP

(57) ABSTRACT

A moving body control device includes a tampering recognition part that executes secure boot processing of verifying presence or absence of tampering with software stored in a storage provided in a moving body, to recognize the tampering with the software, and a tampering responding part that executes tampering response pending processing of maintaining a state in which a predetermined function of the moving body is usable until the moving body enters a standby state, when the tampering recognition part executes the secure boot processing in an activated state of the moving body and the tampering recognition part recognizes the tampering with software related to the predetermined function, the tampering responding part disabling the use of the predetermined function, after the moving body enters the standby state.

10 Claims, 3 Drawing Sheets

(56) References Cited

U.S. PATENT DOCUMENTS

| | | | | |
|---|---|---|---|---|
| 2023/0214493 | A1* | 7/2023 | Tan | G06F 21/575<br>726/22 |
| 2023/0315484 | A1* | 10/2023 | Mora-Golding | G06F 9/4406<br>713/2 |
| 2023/0391345 | A1* | 12/2023 | Sarkar | B60W 50/0205 |
| 2024/0086290 | A1* | 3/2024 | Hirano | G06F 11/301 |
| 2024/0111909 | A1* | 4/2024 | Emerson | G06F 21/575 |
| 2025/0031038 | A1* | 1/2025 | Marotzke | G06F 21/33 |
| 2025/0209175 | A1* | 6/2025 | Mora-Golding | G06F 21/575 |
| 2025/0260594 | A1* | 8/2025 | Mori | B60H 1/00657 |
| 2025/0291896 | A1* | 9/2025 | Lang, Sr. | G06F 21/54 |
| 2025/0307422 | A1* | 10/2025 | Guo | G06F 21/577 |
| 2025/0307478 | A1* | 10/2025 | Kato | G06F 21/86 |
| 2026/0003964 | A1* | 1/2026 | Morita | G06F 21/566 |

* cited by examiner

MOVING BODY CONTROL DEVICE, MOVING BODY CONTROL METHOD, AND STORAGE MEDIUM

INCORPORATION BY REFERENCE

The present application claims priority under 35 U.S.C. § 119 to Japanese Patent Application No. 2024-050799 filed on Mar. 27, 2024. The content of the application is incorporated herein by reference in its entirety.

BACKGROUND OF THE INVENTION

Field of the Invention

The present invention relates to a moving body control device, moving body control method, and storage medium.

Description of the Related Art

Conventionally, a secure boot technique is known in which presence or absence of tampering with software such as firmware is verified when starting an electronic device, and the device is started when it is authenticated that there is no tampering (see, for example, Japanese Patent Laid-Open No. 2021-002168). Japanese Patent Laid-Open No. 2021-002168 discloses a technique for shortening a starting time by collectively authenticating that there is no tampering with a plurality of targets of firmware that are subject to the verification of the presence or absence of the tampering.

In a moving body control device, which is an example of an electronic device, secure boot processing is performed to improve traffic safety, and the secure boot processing is performed in the background while operating a moving body in addition to when starting the moving body. Thus, the secure boot processing performed also during the operation of the moving body can improve reliability of software, though there is a concern that the possibility of false detection of tampering due to increase in times to perform the secure boot processing may increase. Then, when tampering with software is detected by the secure boot processing, measures are taken to stop the operation of the moving body, and when the false detection occurs, the operation of the moving body is stopped as well. In this case, there is a disadvantage that the use of the moving body by a user is interrupted. Therefore, the task of the present application is to inhibit the use of the moving body from being interrupted due to the false detection of the tampering with software.

The present application has an object to improve safety for solving the above problem. Eventually, traffic safety is further improved to contribute to development of a sustainable transportation system.

SUMMARY OF THE INVENTION

As a first aspect for achieving the above object, a moving body control device is provided, the moving body control device including a tampering recognition part that executes secure boot processing of verifying presence or absence of tampering with software stored in a storage provided in a moving body, to recognize the tampering with the software, and a tampering responding part that executes tampering response pending processing of maintaining a state in which a predetermined function of the moving body is usable until the moving body enters a standby state, when the tampering recognition part executes the secure boot processing in an activated state of the moving body and the tampering recognition part recognizes the tampering with software related to the predetermined function, the tampering responding part disabling the use of the predetermined function, after the moving body enters the standby state.

The moving body control device may be configured such that the tampering recognition part executes the secure boot processing a plurality of times, and confirms the recognition of the tampering with the software, when the tampering is continuously detected a predetermined number of determination times or more through the secure boot processing, or when a ratio of a number of times of the detection of the tampering among a plurality of times of the execution of the secure boot processing is equal to or greater than a predetermined determination ratio.

The moving body control device may be configured such that the tampering recognition part sets the number of determination times when the moving body is in the activated state to be greater than the number of determination times when the moving body is in the standby state, and sets the determination ratio when the moving body is in the activated state to be greater than the determination ratio when the moving body is in the standby state.

The moving body control device may be configured such that the tampering recognition part changes the number of determination times and the determination ratio depending on the predetermined function.

The moving body control device may be configured such that the tampering responding part determines whether to execute the tampering response pending processing, depending on a type of the predetermined function of the moving body, when the tampering recognition part executes the secure boot processing in the activated state of the moving body and the tampering recognition part recognizes the tampering with software related to the predetermined function.

The moving body control device may include a moving body position recognition part that recognizes a position of the moving body, the moving body being a vehicle, and may be configured such that the tampering responding part disables the use of the predetermined function of the moving body without executing the tampering response pending processing, in a case where the tampering recognition part executes the secure boot processing and the tampering recognition part recognizes the tampering with software related to the predetermined function, when the moving body is in the activated state and when the moving body position recognition part recognizes that the moving body is at a position other than a road.

The moving body control device may include a tampering notification part that outputs warning information on the tampering with software from a notification device for use in the moving body, when the tampering recognition part recognizes the tampering with software.

The moving body control device may include a tampering notification part that transmits warning information on the tampering with software to a user terminal for use by a user of the moving body, when the tampering recognition part recognizes the tampering with software.

As a second aspect for achieving the above object, a moving body control method to be executed by a computer is provided, the moving body control method including a tampering recognizing step of executing secure boot processing of verifying presence or absence of tampering with software stored in a storage provided in a moving body, to recognize the tampering with the software, and a tampering responding step of executing tampering response pending processing of maintaining a state in which a predetermined function of the moving body is usable until the moving body enters a standby state, when the secure boot processing is executed in an activated state of the moving body by the tampering recognizing step and the tampering with software related to the predetermined function is recognized by the tampering recognizing step, the tampering responding step disabling the use of the predetermined function, after the moving body enters the standby state.

As a third aspect for achieving the above object, a storage medium storing a program is provided that causes a computer to function as a tampering recognition part that executes secure boot processing of verifying presence or absence of tampering with software stored in a storage provided in a moving body, to recognize the tampering with the software, and a tampering responding part that executes tampering response pending processing of maintaining a state in which a predetermined function of the moving body is usable until the moving body enters a standby state, when the tampering recognition part executes the secure boot processing in an activated state of the moving body and the tampering recognition part recognizes the tampering with software related to the predetermined function, the tampering responding part disabling the use of the predetermined function of the moving body, after the moving body enters the standby state.

According to the above moving body control device, moving body control method, and storage medium, it is possible to inhibit use of a moving body from being interrupted due to false detection of tampering with software.

DETAILED DESCRIPTION OF THE INVENTION

1. Configuration of Moving Body Control Device

Figure 1:
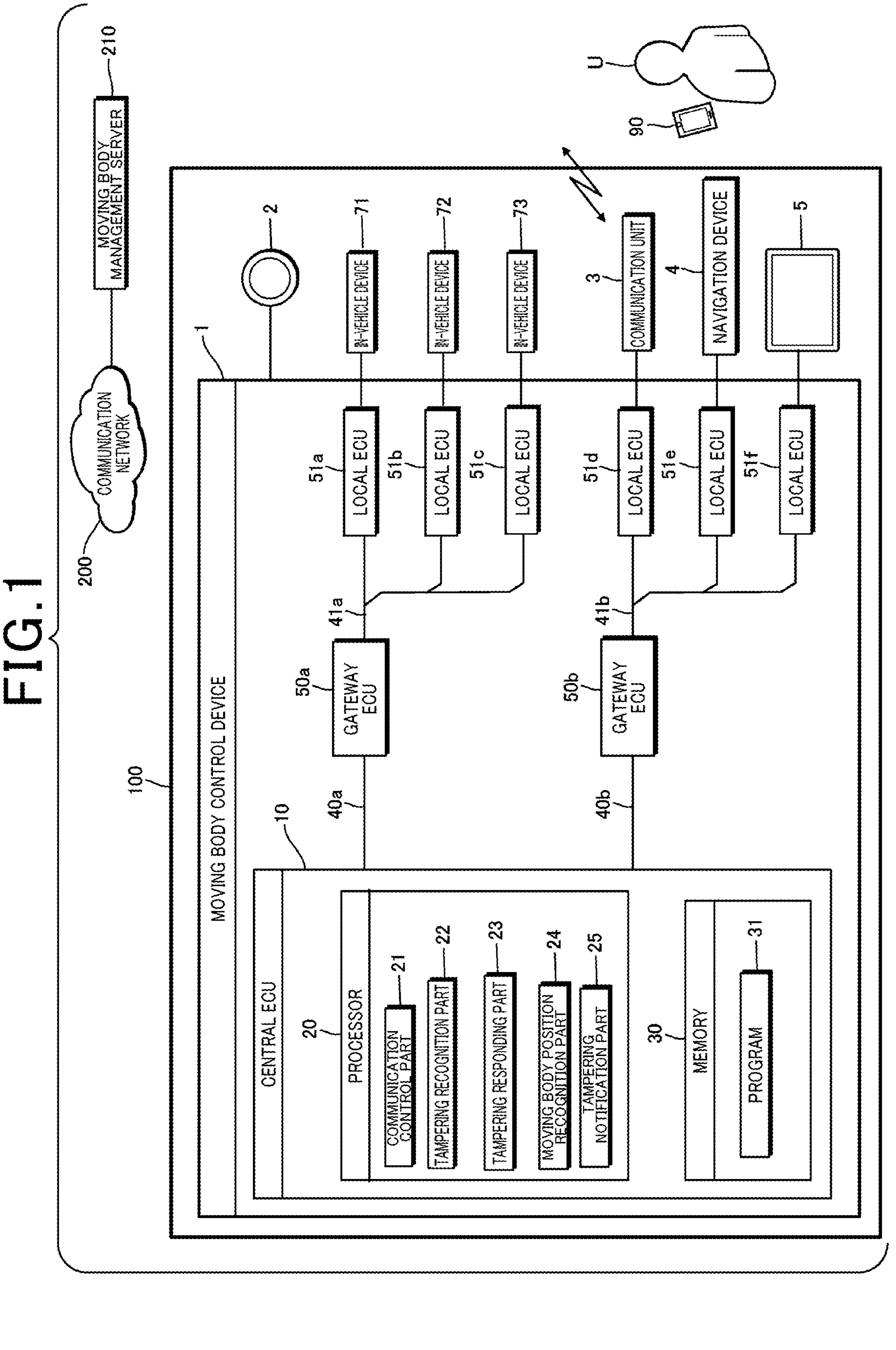
FIG. 1 is a configuration diagram of a moving body control device.

With reference to FIG. 1, a configuration of a moving body control device 1 of the present embodiment will be described. The moving body control device 1 is mounted on a vehicle 100 to control an operation of the vehicle 100. The vehicle 100 corresponds to a moving body of the present disclosure. The moving body of the present disclosure may be the vehicle, an aircraft, a ship, or the like. The vehicle 100 includes a start/stop (SS) switch 2 that instructs start and stop (power ON and power OFF) of the vehicle 100, a communication unit 3 (transmitter/receiver, circuit), a navigation device 4, and a display 5. The vehicle 100 enters an activated state in which the vehicle can run, in response to an activation operation (starting operation) of the SS switch 2, and the vehicle 100 enters a standby state in which the vehicle cannot run, in response to a stop operation (stopping operation) of the SS switch.

The communication unit 3 performs communication with a moving body management server 210 via a communication network 200 and with a user terminal 90 for use by a moving body user U and performs short-range wireless communication with the user terminal 90 through Bluetooth (registered trademark), Wi-Fi (registered trademark), or the like. The navigation device 4 includes a global navigation satellite system (GNSS) sensor that detects a position of the vehicle 100 and provides route guidance to a destination or the like.

The moving body control device 1 includes a central electronic control unit (ECU) 10, gateway ECUs 50*a* and 50*b*, and local ECUs 51*a* to 51*f*. The central ECU 10 is connected to the gateway ECU 50*a* by a communication line 40*a* and is connected to the gateway ECU 50*b* by a communication line 40*b*.

The gateway ECU 50*a* is connected to a plurality of local ECUs 51*a* to 51*c* by a communication line 41*a*, and the gateway ECU 50*b* is connected to a plurality of local ECUs 51*d* to 51*f* by a communication line 41*b*. The local ECUs 51*a* to 51*c* control operations of in-vehicle devices 71 to 73 provided in the vehicle 100. Examples of the in-vehicle devices 71 to 73 include a drive source such as an engine or an electric motor, a driving operation unit such as a steering wheel, a brake pedal, or an accelerator pedal, a light body such as a headlight, auxiliary equipment such as a wiper, an electric device such as a power sliding door or a power window, and an air conditioning device. Furthermore, the local ECU 51*d* controls an operation of the communication unit 3, the local ECU 51*e* controls an operation of the navigation device 4, and the local ECU 51*f* controls an operation of the display 5.

Hereinafter, the gateway ECUs 50*a* and 50*b* are collectively referred to as a gateway ECU 50, and the local ECUs 51*a* to 51*f* are collectively referred to as a local ECU 51. Devices connected to the local ECU 51 are collectively referred to as the in-vehicle device. The central ECU 10, the gateway ECU 50, and the local ECU 51 are control units each including a processor, memory, interface circuit, and the like.

A plurality of local ECUs 51 connected to the gateway ECU 50 are grouped according to a function and location of the in-vehicle device connected to each local ECU 51. FIG. 1 illustrates two gateway ECUs 50*a* and 50*b* and the moving body control device may include three or more gateway ECUs 50. Furthermore, the number of in-vehicle devices connected to the local ECU 51 may be two or more.

The central ECU 10 executes management of the moving body 100 over the air (OTA) and executes processing of downloading an updated version of software of the local ECU 51 (software for updating) from the moving body management server 210 to update the software of the local ECU 51. Furthermore, the central ECU 10 executes processing of monitoring presence or absence of tampering with software stored in the memory of the local ECU 51. Hereinafter, processing executed by the central ECU 10 for recognizing tampering with the software of the local ECU 51 and responding to detection of the tampering with the software will be described.

The central ECU 10 includes a processor 20, a memory 30 (storage medium), and others, and a controlling program 31 of the central ECU 10 is stored in the memory 30. The processor 20 corresponds to the computer of the present disclosure. The processor 20 reads and executes the program 31, thereby functioning as a communication control part 21, a tampering recognition part 22, a tampering responding part 23, a moving body position recognition part 24, and a tampering notification part 25.

Processing executed by the tampering recognition part 22 corresponds to a tampering recognizing step in a moving body control method of the present disclosure, and processing executed by the tampering responding part 23 corresponds to a tampering responding step in the moving body control method of the present disclosure.

The communication control part 21 controls the communication with the moving body management server 210 and the user terminal 90 by the communication unit 3. The tampering recognition part 22 executes secure boot processing of verifying presence or absence of tampering with software stored in a memory of the local ECU 51, to recognize the tampering with the software. The tampering responding part 23 executes processing of disabling use of a predetermined function implemented by operating software, when the tampering recognition part 22 recognizes the tampering with the software of the local ECU 51. This processing will be described later in detail.

The moving body position recognition part 24 communicates with the navigation device 4 to recognize a position of the vehicle 100 detected by the GNSS sensor of the navigation device 4. When the tampering recognition part 22 recognizes tampering with local software, the tampering notification part 25 transmits, to the display 5, tampering notification information notifying that the local software is tampered with, causing the display 5 to display a tampering notification screen indicating that the local software is tampered with. When the tampering recognition part 22 recognizes the tampering with the local software, the tampering notification part 25 also transmits, to the user terminal 90, tampering notification information notifying that the local software is tampered with, causing a display part of the user terminal 90 to display a tampering notification screen indicating that the local software is tampered with.

2. Software Tampering Monitor Processing

With reference to flowcharts shown in FIGS. 2 and 3, a procedure for processing of monitoring the tampering with the software of the local ECU 51, the procedure being executed by the moving body control device 1, will be described. When the vehicle 100 is in the activated state, and when the vehicle 100 is in the standby state, the moving body control device 1 executes, at predetermined time, processing shown in the flowcharts in FIGS. 2 and 3 for software stored in a memory of each of a plurality of local ECUs 51, to monitor presence or absence of the tampering. Time to execute the secure boot processing is set, for example, when the vehicle 100 is brought into the standby state by the stop operation of the SS switch 2, or every time a predetermined time elapses.

Figure 2:
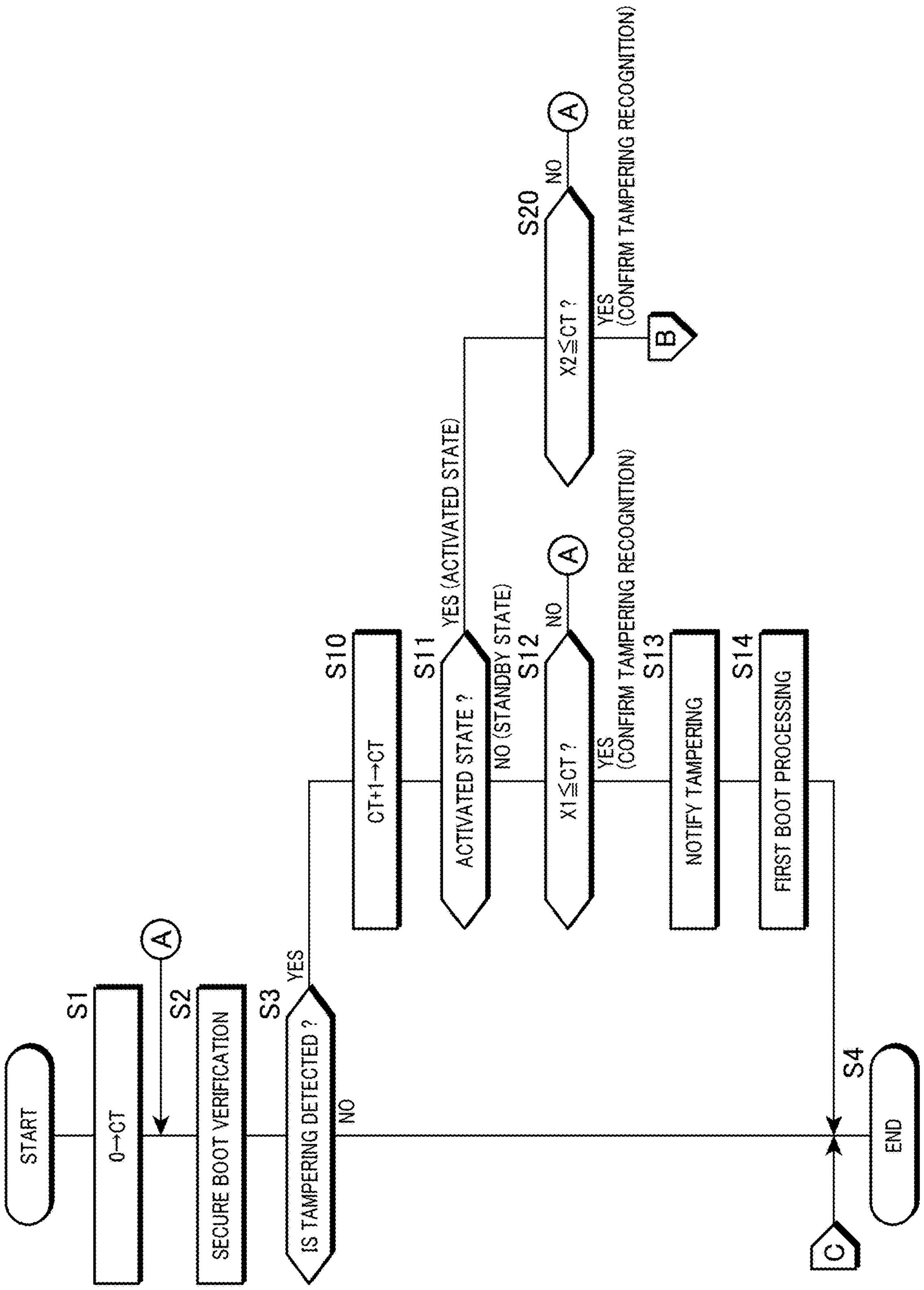
FIG. 2 is a first flowchart of software tampering monitor processing of an ECU.

In step S1 of FIG. 2, the tampering recognition part 22 resets a counter variable CT for counting the number of times of detection of tampering (0→CT). Subsequently, in step S2, for the software of the local ECU 51 (hereinafter referred to as the target software), which is a target of secure booting, secure boot processing is executed to verify presence or absence of the tampering. Subsequently, in step S3, the tampering recognition part 22 proceeds with processing to step S10 when tampering with the target software is detected and proceeds with the processing to step S4 when the tampering with the target software is not detected, to end the tampering monitor processing.

In step S10, the tampering recognition part 22 counts up the counter variable CT (CT+1→CT). Subsequently, in step S11, the tampering recognition part 22 determines whether the vehicle 100 is in the activated state, proceeds with the processing to step S20 when the vehicle is in the activated state, and proceeds with the processing to step S12 when the vehicle is not in the activated state (when in the standby state).

In step S12, the tampering recognition part 22 determines whether the counter variable CT is equal to or greater than a first number of determination times X1. Then, when the counter variable CT is equal to or greater than the first number of determination times X1, the tampering recognition part 22 confirms the recognition of the tampering with the target software and proceeds with the processing to step S13, and when the counter variable CT is smaller than the first number of determination times, the tampering recognition part proceeds with the processing to step S2.

In step S13, the tampering notification part 25 displays the tampering notification screen on the display 5 or the display part of the user terminal 90 as described above. Subsequently, in step S14, the tampering responding part 23 executes prohibiting the vehicle 100 from being activated as first boot processing to the tampering. The user U visually recognizes the tampering notification screen, recognizes the tampering with the target software, and requests a roadside assistance company or the like for troubleshooting of failure of the vehicle 100.

In processing of steps S2, S3, and S10 to S14, when the tampering with the target software is continuously detected the first number of determination times X1 or more, the recognition of the tampering with the target software is confirmed, so that the vehicle 100 can be inhibited from being brought into an activation prohibited state by false detection of tampering.

In step S20, the tampering recognition part 22 determines whether the counter variable CT is equal to or greater than a second number of determination times X2. Then, when the counter variable CT is equal to or greater than the second number of determination times X2, the tampering recognition part 22 confirms the recognition of the presence of the tampering with the target software and proceeds with the processing to step S21 of FIG. 3, and when the counter variable CT is smaller than the second number of determination times X2, the tampering recognition part proceeds with the processing to step S2.

Here, the second number of determination times X2 corresponding to the time when the vehicle 100 is in the activated state is set to the number of times greater than the first number of determination times X1 corresponding to the time when the vehicle 100 is in the standby state. Consequently, when the vehicle 100 is in the activated state, the user U uses the vehicle 100 and there is little concern of theft or the like of the vehicle 100, and therefore, the use of the vehicle 100 can be inhibited from being interrupted by execution of boot processing of the vehicle 100 due to false detection of the tampering with the target software.

Figure 3:
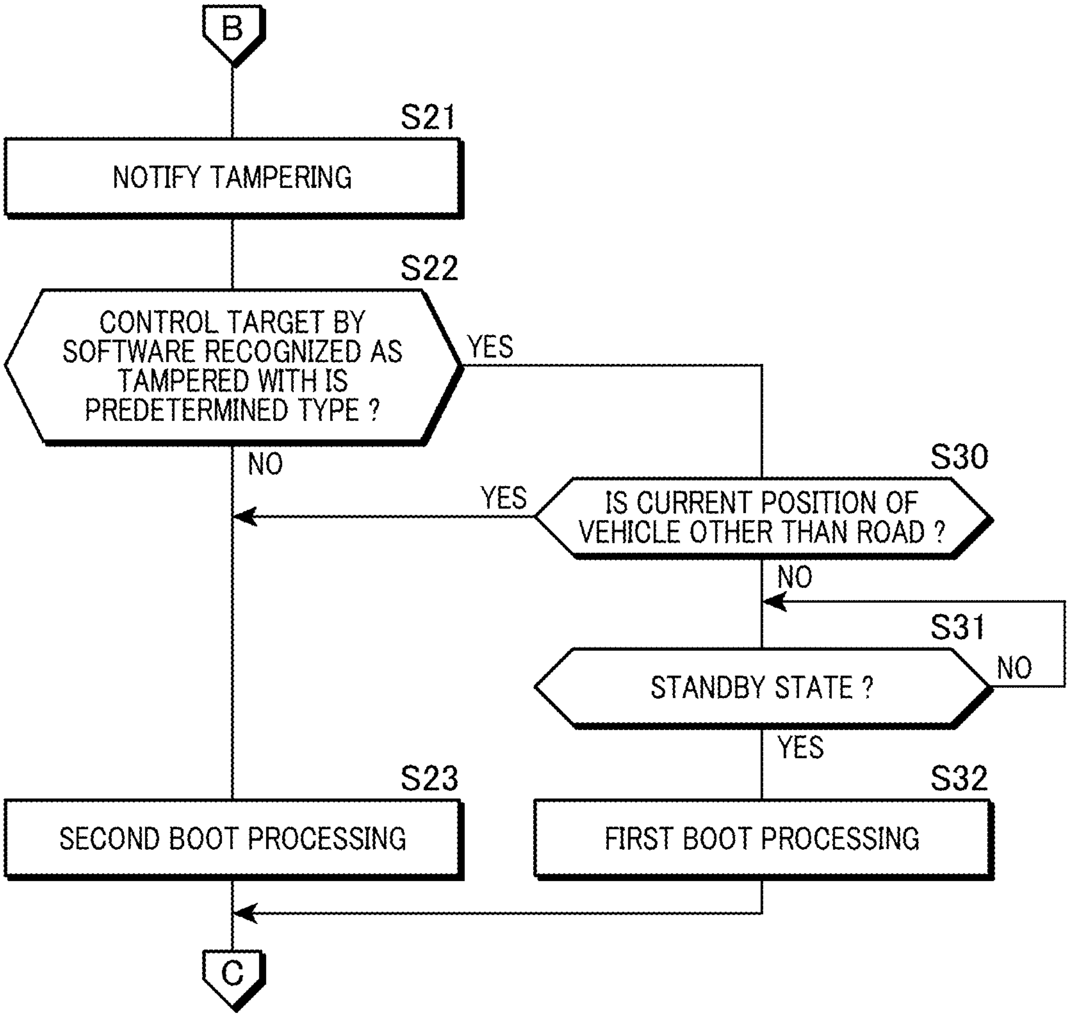
FIG. 3 is a second flowchart of the tampering monitor processing of the software of the ECU.

In step S21 of FIG. 3, the tampering notification part 25 displays the tampering notification screen on the display 5 or the display part of the user terminal 90 as described above. Subsequently, in step S22, the tampering responding part 23 determines whether a control target by the target software recognized as being tampered with is a predetermined function. Here, the predetermined function is a function that does not hinder the running of the vehicle 100 (for example, an entertainment function such as content displaying function by the display 5, a communicating function by the communication unit 3, air conditioning, a connecting function to a portable device via an interface such as USB (registered trademark), or the like).

Then, the tampering responding part 23 proceeds with the processing to step S30, when the control target by the target software is the predetermined function, and proceeds with the processing to step S23, when the control target by the target software is not the predetermined function. In step S23, the tampering responding part 23 executes second boot processing corresponding to the case where the vehicle 100 is in the activated state and proceeds with the processing to step S4 of FIG. 2.

As the second boot processing, the tampering responding part 23 performs fallback control such as deceleration and stop guidance to the shoulder of a road, when the vehicle 100 is running, and performs processing of prohibiting the vehicle 100 from being activated, when the vehicle 100 is brought into the standby state by the operation of the SS switch 2 after the vehicle 100 stops.

In step S30, the tampering responding part 23 determines whether a current position of the vehicle 100 recognized by the moving body position recognition part 24 is a position other than the road. The tampering responding part 23 then proceeds with the processing to step S23, when the current position of the vehicle 100 is a position other than the road, and proceeds with the processing to step S31, when the current position of the vehicle 100 is on the road.

In step S31, when the vehicle 100 enters the standby state in response to the operation of the SS switch 2, the tampering responding part 23 proceeds with the processing to step S32 and executes the first boot processing corresponding to the standby state in the same manner as in step S14 of FIG. 2 described above, to proceed with the processing to step S4 of FIG. 2. The processing in step S30 corresponds to tampering response pending processing of the present disclosure.

3. Other Embodiments

In the above embodiment, the tampering recognition part 22 confirms the recognition of the tampering with the target software when the tampering with the target software is continuously detected the predetermined number of determination times or more by the secure boot processing. As another embodiment, the tampering recognition part 22 may execute the secure boot processing a plurality of times and confirm the recognition of the tampering with the target software, when a ratio of the number of times the tampering with the target software is detected among the plurality of times to execute the secure boot processing is equal to or greater than a predetermined determination ratio. In this case, a second determination ratio corresponding to a case where the vehicle 100 is in the activated state may be set to a ratio greater than a first determination ratio corresponding to a case where the vehicle 100 is in the standby state (first determination ratio<second determination ratio).

Furthermore, the first number of determination times, the second number of determination times, the first determination ratio, and the second determination ratio may be changed depending on a predetermined function related to the target software. For example, first and second numbers of determination times for target software of a running control system of the vehicle 100 may be numbers of times smaller than first and second numbers of determination times for target software related to control other than the control of the running control system (target software related to air conditioning, entertainment, or the like). In addition, first and second determination ratios for the target software of the running control system of the vehicle 100 may be ratios smaller than first and second determination ratios for the target software related to control other than the control of the running control system (target software related to air conditioning, entertainment, or the like).

In the above embodiment, the tampering recognition part 22 sets the second number of determination times X2 corresponding to the case where the vehicle 100 is in the activated state to the number of times greater than the first number of determination times X1 corresponding to the case where the vehicle 100 is in the standby state (X1<X2). As another embodiment, the first number of determination times X1 and the second number of determination times X2 may be set to the same number of times. Furthermore, when the tampering with the target software is detected by the secure boot processing, the recognition of the tampering with the target software may be confirmed without determining the number of tampering detection times.

The above embodiment includes the moving body position recognition part 24, and the tampering responding part 23 determines in step S30 of FIG. 3 whether the current position of the vehicle 100 is a position other than the road and puts the execution of the first boot processing of step S32 on hold until the vehicle 100 enters the standby state in step S31. Another embodiment may be configured such that the moving body position recognition part 24 is omitted and the determination of step S30 is not performed.

In the above embodiment, the tampering responding part 23 determines whether to put the execution of the first boot processing of step S32 on hold until the vehicle 100 enters the standby state in step S31, by determining the type of the control target by the target software in step S22 of FIG. 3. As another embodiment, the determination processing in step S22 may be omitted and the execution of the first boot processing of step S32 may be put on hold until the vehicle 100 enters the standby state in step S31, regardless of the type of the control target by the target software.

The above embodiment includes the tampering notification part 25 to notify the tampering with the software and may be configured to omit the tampering notification part 25.

To facilitate the understanding of the present invention, FIG. 1 is a schematic diagram showing the configuration of the moving body control device 1 by dividing the configuration according to main processing contents, and the moving body control device 1 may be configured by another division. Furthermore, processing of each component may be executed by one hardware unit or executed by a plurality of hardware units. In addition, the processing by each component shown in FIGS. 2 and 3 may be executed by one program or executed by a plurality of programs.

4. Configuration Supported by the Above Embodiment

The above embodiment is a specific example including configurations as follows.

(Configuration 1) A moving body control device comprising: a tampering recognition part that executes secure boot processing of verifying presence or absence of tampering with software stored in a storage provided in a moving body, to recognize the tampering with the software; and a tampering responding part that executes tampering response pending processing of maintaining a state in which a predetermined function of the moving body is usable until the moving body enters a standby state, when the tampering recognition part executes the secure boot processing in an activated state of the moving body and the tampering recognition part recognizes the tampering with software related to the predetermined function, the tampering responding part disabling the use of the predetermined function, after the moving body enters the standby state.

According to the moving body control device of Configuration 1, it is possible to inhibit the use of the moving body from being disabled by false detection of tampering with software, by maintaining the state in which the predetermined function related to software can be used until the moving body enters the standby state, when the tampering with the software is recognized in the activated state of the moving body.

(Configuration 2) The moving body control device according to Configuration 1, wherein the tampering recognition part executes the secure boot processing a plurality of times, and confirms the recognition of the tampering with the software, when the tampering is continuously detected a predetermined number of determination times or more through the secure boot processing, or when a ratio of a number of times of the detection of the tampering among a plurality of times of the execution of the secure boot processing is equal to or greater than a predetermined determination ratio.

According to the moving body control device of Configuration 2, it is possible to reduce a possibility that tampering with software is falsely recognized, by executing the secure boot processing a plurality of times to confirm the recognition of the software tampering.

(Configuration 3) The moving body control device according to Configuration 2, wherein the tampering recognition part sets the number of determination times when the moving body is in the activated state to be greater than the number of determination times when the moving body is in the standby state, and sets the determination ratio when the moving body is in the activated state to be greater than the determination ratio when the moving body is in the standby state.

According to the moving body control device of Configuration 3, when it is assumed that concern of theft of the moving body is low because the moving body is in the activated state and the user uses the moving body, it is possible to reduce a possibility that the tampering with software is falsely recognized, by setting a greater number of determination times than when the moving body is in the standby state, or by setting a greater determination ratio than when the moving body is in the standby state.

(Configuration 4) The moving body control device according to Configuration 2 or 3, wherein the tampering recognition part changes the number of determination times and the determination ratio depending on the predetermined function.

According to the moving body control device of Configuration 4, it is possible to reduce the possibility that the tampering with software is falsely recognized, by changing an appropriate number of determination times and an appropriate determination ratio depending on a predetermined function related to the software.

(Configuration 5) The moving body control device according to any one of Configurations 1 to 4, wherein the tampering responding part determines whether to execute the tampering response pending processing, depending on a type of a predetermined function of the moving body, when the tampering recognition part executes the secure boot processing in the activated state of the moving body and the tampering recognition part recognizes the tampering with software related to the predetermined function.

According to the moving body control device of Configuration 5, it is possible to determine whether to execute tampering response pending processing, for example, depending on whether the type of a predetermined function related to the software contributes to control of movement of the moving body.

(Configuration 6) The moving body control device according to any one of Configurations 1 to 5, further comprising a moving body position recognition part that recognizes a position of the moving body, the moving body being a vehicle, wherein the tampering responding part disables the use of the predetermined function of the moving body without executing the tampering response pending processing, in a case where the tampering recognition part executes the secure boot processing and the tampering recognition part recognizes the tampering with software related to the predetermined function, when the moving body is in the activated state and when the moving body position recognition part recognizes that the moving body is at a position other than a road.

According to the moving body control device of Configuration 6, it is possible to perform tampering response processing of disabling use of the predetermined function immediately when it is assumed that there is little inconvenience to the user, even if the vehicle is stopped in a parking space or the like other than the road and the use of the predetermined function related to the software recognized as being tampered with is disabled.

(Configuration 7) The moving body control device according to any one of Configurations 1 to 6, further comprising a tampering notification part that outputs warning information on the tampering with software from a notification device for use in the moving body, when the tampering recognition part recognizes the tampering with software.

According to the moving body control device of Configuration 7, it is possible to notify the user that the tampering with the software is recognized and prompt the user to respond to the tampering.

(Configuration 8) The moving body control device according to any one of Configurations 1 to 7, further comprising: a tampering notification part that transmits warning information on the tampering with software to a user terminal for use by a user of the moving body, when the tampering recognition part recognizes the tampering with software.

According to the moving body control device of Configuration 8, it is possible to notify the user that the tampering with the software is recognized and prompt the user to respond to the tampering.

(Configuration 9) A moving body control method to be executed by a computer, including a tampering recognizing step of executing secure boot processing of verifying presence or absence of tampering with software stored in a storage provided in a moving body, to recognize the tampering with the software, and a tampering responding step of executing tampering response pending processing of maintaining a state in which a predetermined function of the moving body is usable until the moving body enters a standby state, when the secure boot processing is executed in an activated state of the moving body by the tampering recognizing step and the tampering with software related to the predetermined function is recognized by the tampering recognizing step, the tampering responding step disabling the use of the predetermined function, after the moving body enters the standby state.

By executing the moving body control method of Configuration 9 with the computer, the same operations and effects as in the moving body control device of Configuration 1 can be obtained.

(Configuration 10) A storage medium storing a program causing a computer to function as a tampering recognition part that executes secure boot processing of verifying presence or absence of tampering with software stored in a storage provided in a moving body, to recognize the tampering with the software, and a tampering responding part that executes tampering response pending processing of maintaining a state in which a predetermined function of the moving body is usable until the moving body enters a standby state, when the tampering recognition part executes the secure boot processing in an activated state of the moving body and the tampering recognition part recognizes the tampering with software related to the predetermined function, the tampering responding part disabling the use of the predetermined function of the moving body, after the moving body enters the standby state.

By executing the program of Configuration 10 with the computer, a configuration of the moving body control device of Configuration 1 can be implemented.

REFERENCE SIGNS LIST

1 . . . moving body control device, 2 . . . SS switch, 3 . . . communication unit, 4 . . . navigation device, 5 . . . display, 10 . . . central ECU, 20 . . . processor, 21 . . . communication control part, 22 . . . tampering recognition part, 23 . . . tampering responding part, 24 . . . moving body position recognition part, 25 . . . tampering notification part, 30 . . . memory, 31 . . . program, 50 (50*a*, 50*b*) . . . gateway ECU, 51 (51*a* to 51*f*) . . . local ECU, 71 to 73 . . . in-vehicle device, 90 . . . user terminal, 100 . . . vehicle (moving body), 200 . . . communication network, 210 . . . moving body management server, U . . . user.

The invention claimed is:

1. A moving body control device comprising:

a tampering recognition part that executes secure boot processing of verifying presence or absence of tampering with software stored in a storage provided in a moving body, to recognize the tampering with the software; and a tampering responding part that executes tampering response pending processing of maintaining a state in which a predetermined function of the moving body is usable until the moving body enters a standby state, when the tampering recognition part executes the secure boot processing in an activated state of the moving body and the tampering recognition part recognizes the tampering with software related to the predetermined function, the tampering responding part disabling the use of the predetermined function, after the moving body enters the standby state.

2. The moving body control device according to claim 1, wherein the tampering recognition part executes the secure boot processing a plurality of times, and confirms the recognition of the tampering with the software, when the tampering is continuously detected a predetermined number of determination times or more through the secure boot processing, or when a ratio of a number of times of the detection of the tampering among a plurality of times of the execution of the secure boot processing is equal to or greater than a predetermined determination ratio.

3. The moving body control device according to claim 2, wherein the tampering recognition part sets the number of determination times when the moving body is in the activated state to be greater than the number of determination times when the moving body is in the standby state, and sets the determination ratio when the moving body is in the activated state to be greater than the determination ratio when the moving body is in the standby state.

4. The moving body control device according to claim 2, wherein the tampering recognition part changes the number of determination times and the determination ratio depending on the predetermined function.

5. The moving body control device according to claim 1, wherein the tampering responding part determines whether to execute the tampering response pending processing, depending on a type of the predetermined function of the moving body, when the tampering recognition part executes the secure boot processing in the activated state of the moving body and the tampering recognition part recognizes the tampering with software related to the predetermined function.

6. The moving body control device according to claim 1, further comprising a moving body position recognition part that recognizes a position of the moving body, the moving body being a vehicle, wherein the tampering responding part disables the use of the predetermined function of the moving body without executing the tampering response pending processing, in a case where the tampering recognition part executes the secure boot processing and the tampering recognition part recognizes the tampering with software related to the predetermined function, when the moving body is in the activated state and when the moving body position recognition part recognizes that the moving body is at a position other than a road.

7. The moving body control device according to claim 1, further comprising a tampering notification part that outputs warning information on the tampering with software from a notification device for use in the moving body, when the tampering recognition part recognizes the tampering with software.

8. The moving body control device according to claim 1, further comprising a tampering notification part that transmits warning information on the tampering with software to a user terminal for use by a user of the moving body, when the tampering recognition part recognizes the tampering with software.

9. A moving body control method to be executed by a computer, comprising:

a tampering recognizing step of executing secure boot processing of verifying presence or absence of tampering with software stored in a storage provided in a moving body, to recognize the tampering with the software; and a tampering responding step of executing tampering response pending processing of maintaining a state in which a predetermined function of the moving body is usable until the moving body enters a standby state, when the secure boot processing is executed in an activated state of the moving body by the tampering recognizing step and the tampering with software related to the predetermined function is recognized by the tampering recognizing step, the tampering responding step disabling the use of the predetermined function, after the moving body enters the standby state.

10. A non-transitory computer readable storage medium storing a program causing a computer to function as:

a tampering recognition part that executes secure boot processing of verifying presence or absence of tampering with software stored in a storage provided in a moving body, to recognize the tampering with the software; and a tampering responding part that executes tampering response pending processing of maintaining a state in which a predetermined function of the moving body is usable until the moving body enters a standby state, when the tampering recognition part executes the secure boot processing in an activated state of the moving body and the tampering recognition part recognizes the tampering with software related to the predetermined function, the tampering responding part disabling the use of the predetermined function of the moving body, after the moving body enters the standby state.

* * * * *